(12) United States Patent
Connelly

(10) Patent No.: US 9,783,285 B2
(45) Date of Patent: Oct. 10, 2017

(54) THERMAL INSULATION SUPPORT

(75) Inventor: Thomas Joseph Connelly, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 1222 days.

(21) Appl. No.: 13/441,993

(22) Filed: Apr. 9, 2012

(65) Prior Publication Data

US 2013/0266769 A1    Oct. 10, 2013

(51) Int. Cl.
*B64C 7/02* (2006.01)
*B64D 27/18* (2006.01)
*B64D 29/00* (2006.01)
*B64C 1/40* (2006.01)

(52) U.S. Cl.
CPC ................ *B64C 7/02* (2013.01); *B64C 1/40* (2013.01); *B64D 27/18* (2013.01); *B64D 29/00* (2013.01); *Y10T 29/49826* (2015.01); *Y10T 428/24612* (2015.01)

(58) Field of Classification Search
CPC .. B64C 7/02; B64C 1/40; B64D 29/00; B64D 27/18; Y10T 428/24612; Y10T 29/49826
USPC .......... 428/172; 29/428; 248/226.11
See application file for complete search history.

(56) References Cited

U.S. PATENT DOCUMENTS

| | | | |
|---|---|---|---|
| 3,799,056 A * | 3/1974 | Colignon | 244/117 A |
| 5,906,097 A | 5/1999 | Hebert et al. | |
| 6,983,912 B2 | 1/2006 | Connelly et al. | |
| 7,927,686 B2 | 4/2011 | Zielinski et al. | |
| 7,943,227 B2 | 5/2011 | Connelly | |
| 8,118,252 B2 | 2/2012 | Dumont et al. | |
| 2007/0151539 A1 | 7/2007 | Upton et al. | |
| 2009/0026246 A9 * | 1/2009 | Connelly et al. | 228/157 |
| 2009/0098321 A1 | 4/2009 | Zielinski et al. | |

FOREIGN PATENT DOCUMENTS

| FR | 2534349 A1 | 4/1984 |
|---|---|---|
| WO | 0026098 A1 | 5/2000 |

OTHER PUBLICATIONS

Extended European Search Report for application No. 131621613.3-1754 / 2650211, dated Apr. 10, 2017, 8 pages.

* cited by examiner

*Primary Examiner* — Brian Handville
(74) *Attorney, Agent, or Firm* — Armstrong Teasdale LLP

(57) ABSTRACT

A thermal insulation support includes a body including a first edge portion and a second edge portion extending generally along a longitudinal axis of the body. A first flange extending a first distance from the first edge portion of the body is coupled to a first wall. A second flange extending a second distance from the second edge portion of the body is coupled to a second wall.

19 Claims, 3 Drawing Sheets

THERMAL INSULATION SUPPORT

BACKGROUND

The present disclosure relates generally to insulation systems and, more particularly, to a support for use in supporting a thermal insulation block within a heat shield.

At least some known heat shield assemblies are positioned above an engine exhaust to facilitate reducing heat transfer. For example, due to its proximity to the engine exhaust, the lower skin of at least some known heat shield assemblies may be exposed to relatively high temperatures. To facilitate increasing an efficiency of the heat shield assembly, at least some known engines include insulation positioned within the heat shield assembly directly against the lower skin. To accommodate increased exhaust temperatures, at least some known heat shield assemblies use a thicker insulation. Increasing a thickness of the insulation, however, may increase a weight associated with the insulation and/or heat shield assembly.

BRIEF SUMMARY

In one aspect, a method is provided for use in installing an insulation support within a heat shield assembly. The method includes coupling a first flange to a first wall of the heat shield assembly. The first flange extends a first distance from a first edge portion of a body. The first edge portion extends generally along a longitudinal axis of the body. A second flange is coupled to a second wall of the heat shield assembly. The second flange extends a second distance from a second edge portion of the body. The second edge portion extends generally along the longitudinal axis of the body.

In another aspect, a thermal insulation support is provided for use within a heat shield assembly. The thermal insulation support includes a body including a first edge portion and a second edge portion extending generally along a longitudinal axis of the body. A first flange extends a first distance from the first edge portion of the body. The first flange is coupleable to a first wall of the heat shield assembly. A second flange extends a second distance from the second edge portion of the body. The second flange is coupleable to a second wall of the heat shield assembly.

In yet another aspect, a heat shield assembly is provided. The heat shield assembly includes a lower skin, an upper skin, and a plurality of ribs extending between the lower skin and the upper skin. At least one thermal insulation support is disposed between the lower skin and the upper skin. The thermal insulation support includes a body that includes a first edge portion and a second edge portion extending generally along a longitudinal axis of the body. A first flange extends a first distance from the first edge portion of the body. A second flange extends a second distance from the second edge portion of the body. The first flange is coupled to a first rib of the plurality of ribs, and the second flange is coupled to a second rib of the plurality of ribs.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to insulation systems and, more particularly, to a thermal insulation support that maybe used to support a thermal insulation block within a heat shield assembly. In one embodiment, a thermal insulation support includes a body including a first edge portion and a second edge portion extending generally along a longitudinal axis of the body. The body has a wave-shaped configuration extending between the first edge portion and the second edge portion. A first flange extending generally upwardly from the first edge portion of the body is coupled to a first wall, and a second flange extending generally upwardly from the second edge portion of the body is coupled to a second wall. An insulation block is positioned within the heat shield assembly on top of the thermal insulation support. Accordingly, the thermal insulation support enables the insulation block to be positioned within the heat shield assembly remote from a warmer lower skin of the heat shield assembly and/or adjacent to a cooler upper skin of the heat shield assembly.

As used herein, an element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
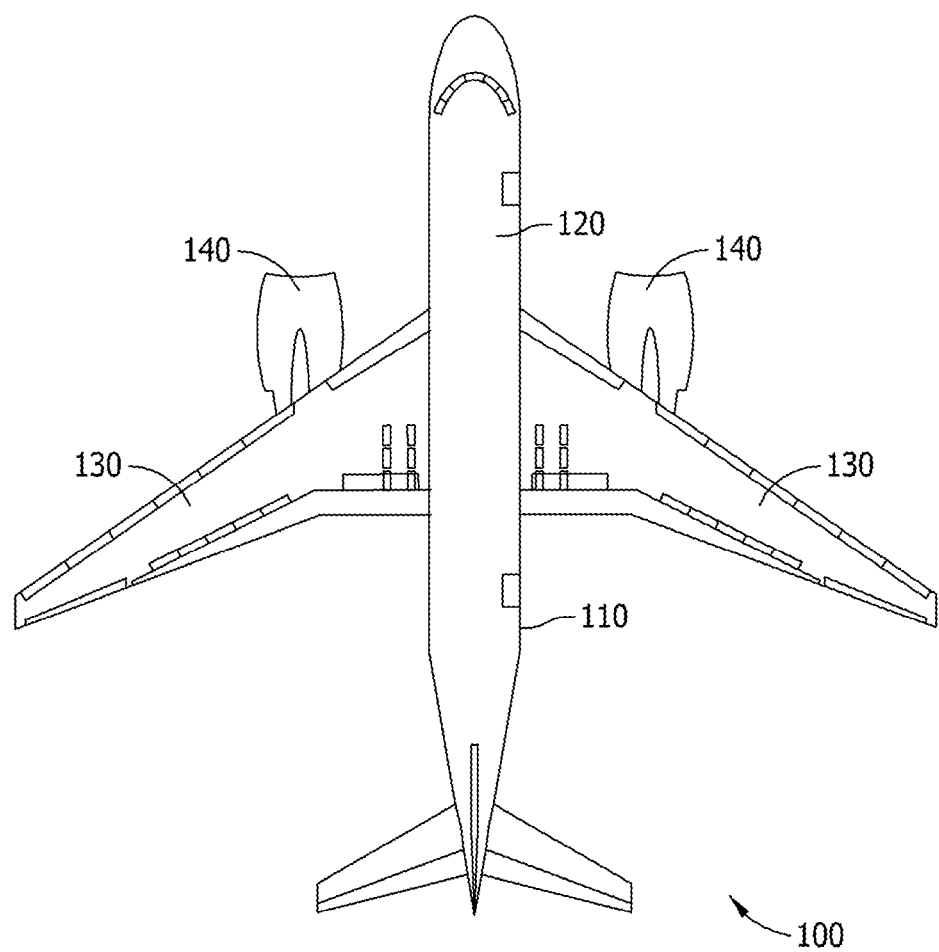
FIG. 1 is a plan view of an exemplary aircraft.

FIG. 1 is a plan view of an exemplary aircraft 100 including a body 110. In the exemplary embodiment, body 110 includes a fuselage 120 and a pair of wings 130 extending from fuselage 120. In the exemplary embodiment, at least one engine 140 is coupled to each wing 130 to provide thrust to aircraft 100. Aircraft 100 may include any number of engines 140 that enables aircraft 100 to function as described herein.

Figure 2:
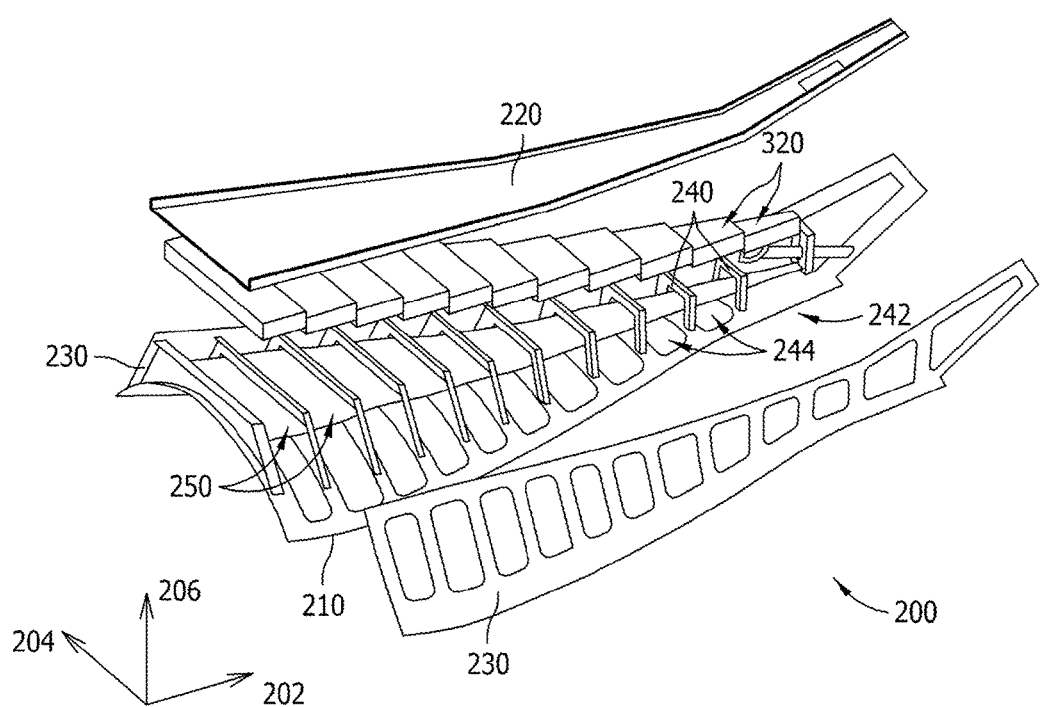
FIG. 2 is an exploded view of an exemplary heat shield assembly that may be used with the aircraft shown in FIG. 1.

FIG. 2 is an exploded view of an exemplary heat shield assembly 200 that may be coupled to an aft pylon fairing (not shown) and/or wing 130 on aircraft 100. In the exemplary embodiment, heat shield assembly 200 has a longitudinal or X-axis 202, a lateral or Y-axis 204 that is substantially perpendicular to the X-axis 202, and a vertical or Z-axis 206 that is substantially perpendicular to the X-axis 202 and the Y-axis 204. In the exemplary embodiment, heat shield assembly 200 includes a generally concave lower skin 210 that generally extends in the X-Y plane, a generally convex upper skin 220 that generally extends in the X-Y plane, a pair of side skins 230 that generally extend in the X-Z plane, and a plurality of ribs 240 extending between lower skin 210 and upper skin 220 in the Y-Z plane.

In the exemplary embodiment, lower skin 210 is disposed generally above an engine exhaust (not shown) and is fabricated from a material that substantially withstands relatively high temperatures without substantially creeping.

For example, in the exemplary embodiment, lower skin 210 is fabricated from a titanium material. Alternatively, lower skin 210 may be fabricated from any material that enables lower skin 210 to function as described herein.

In the exemplary embodiment, upper skin 220 is a fluid barrier that at least partially defines a channel (not shown) that is configured to channel a fluid therethrough to facilitate cooling heat shield assembly 200. Because of their relative positions, during operation in the exemplary embodiment, lower skin 210 is generally at a higher temperature than upper skin 220, and/or upper skin 220 is generally at a lower temperature than lower skin 210. Alternatively, lower skin 210 and/or upper skin 220 may be disposed in any position and/or orientation that enables heat shield assembly 200 to function as described herein.

In the exemplary embodiment, side skins 230 extend between lower skin 210 and upper skin 220 and are spaced along the Y-axis 204 to at least partially define a heat shield cavity 242 therein. In the exemplary embodiment, ribs 240 are disposed within cavity 242 and generally extend between lower skin 210 and upper skin 220 and between side skins 230. In the exemplary embodiment, ribs 240 are spaced along the X-axis 202 to at least partially define a plurality of heat shield bays 244 within cavity 242.

Figure 3:
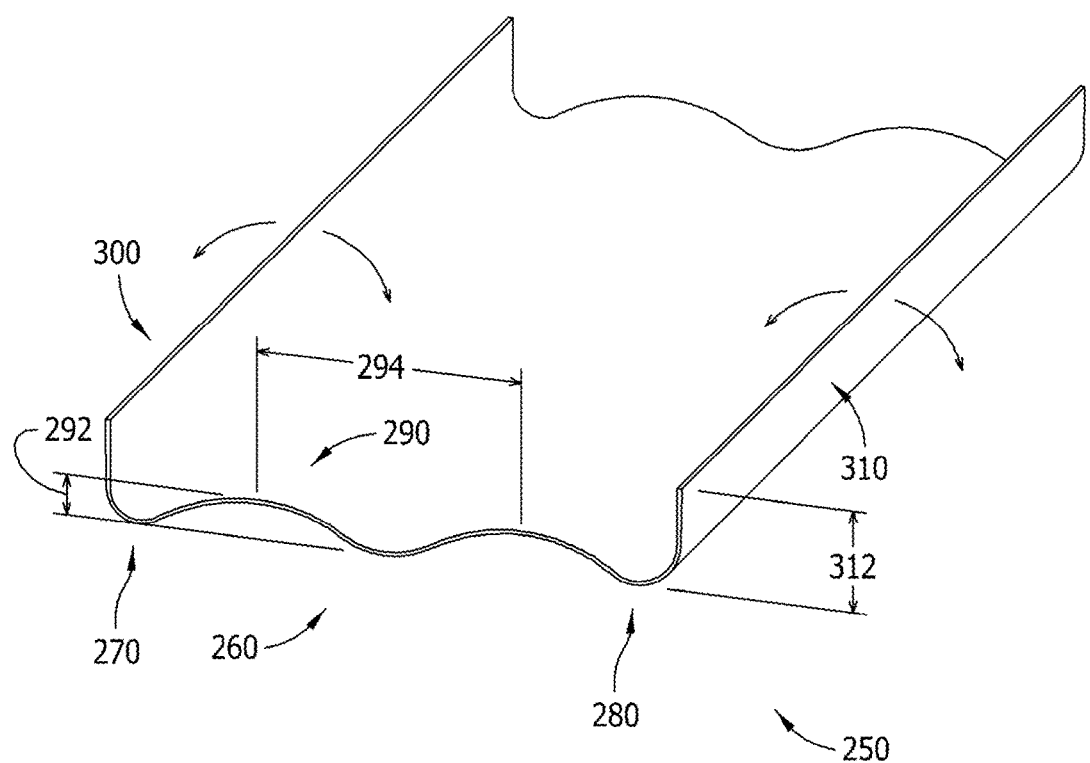
FIG. 3 is a perspective view of an exemplary thermal insulation support that may be used with the heat shield assembly shown in FIG. 2.

In the exemplary embodiment, at least one thermal insulation support 250 is positioned within each bay 244. More specifically, in the exemplary embodiment, thermal insulation support 250 is disposed between lower skin 210 and upper skin 220 and longitudinally aligned substantially perpendicularly to side skins 230. As shown in FIG. 3, thermal insulation support 250 includes a body 260 that includes a first edge portion 270 and a second edge portion 280 extending generally along a longitudinal axis of body 260. More specifically, in the exemplary embodiment, first edge portion 270 and second edge portion 280 are aligned generally in a parallel orientation along the Y-axis 204. Alternatively, first edge portion 270 and/or second edge portion 280 may be aligned and/or oriented in any configuration that enables thermal insulation support 250 to function as described herein.

In the exemplary embodiment, body 260 has a wave-shaped configuration extending between first edge portion 270 and second edge portion 280. More specifically, in the exemplary embodiment, the wave-shaped configuration includes at least one wave 290 extending between first edge portion 270 and second edge portion 280. In the exemplary embodiment, wave 290 enables body 260 to provide support to an insulation block, described in more detail below, within a high sonic environment while being relatively light weight and/or thin.

In the exemplary embodiment, wave 290 has a body or wave height 292 that is less than approximately 1.0 inch (in.) and a wave length 294 that is less than approximately 4.0 in. More particularly, in the exemplary embodiment, wave height 292 is less than approximately 0.5 in., and wave length 294 is between approximately 1.0 in. and approximately 3.0 in. Even more particularly, in the exemplary embodiment, wave height 292 is approximately 0.25 in., and wave length 294 is approximately 2.0 in. In one embodiment, the wave-shaped configuration includes a plurality of waves 290 that are spaced along the longitudinal axis in a staggered configuration. That is, in such an embodiment, each wave 290 includes a peak and/or nadir at a distance from first edge portion 270 and/or second edge portion 280 that is different from at least one other wave 290. For example, in one embodiment, body 260 has an egg carton-like configuration. Alternatively, body 260 may have any configuration that enables thermal insulation support 250 to function as described herein.

In the exemplary embodiment, a first flange 300 and/or a second flange 310 enable body 260 to be suspended within bay 244. That is, in the exemplary embodiment, first flange 300 and/or second flange 310 enable thermal insulation support 250 to be coupled within heat shield assembly 200. In the exemplary embodiment, first flange 300 and second flange 310 extend generally upwardly from body 260. More specifically, in the exemplary embodiment, a first flange 300 extends substantially perpendicularly from first edge portion 270, and/or second flange 310 extends substantially perpendicularly from second edge portion 280. In the exemplary embodiment, first edge portion 270 and/or second edge portion 280 includes a curved heel such that first flange 300 and/or second flange 310 extend generally seamlessly from body 260. For example, in the exemplary embodiment, body 260, first flange 300, and second flange 310 are integrally formed such that thermal insulation support 250 is substantially seamless. Alternatively, first flange 300 and/or second flange 310 may be aligned and/or oriented in any configuration that enables thermal insulation support 250 to function as described herein.

In the exemplary embodiment, first flange 300 and/or second flange 310 are moveable between a base configuration and a deflected configuration. More specifically, in the exemplary embodiment, first flange 300 and/or second flange 310 is rotatable generally about the curved heel such that first flange 300 and/or second flange 310 are moved from extending substantially perpendicularly from body 260. In the exemplary embodiment, first flange 300 and/or second flange 310 are biased toward the base configuration. Alternatively, first flange 300 and/or second flange 310 may move in any direction and/or be biased in any position that enables thermal insulation support 250 to function as described herein.

In the exemplary embodiment, first flange 300 and/or second flange 310 have a flange height 312 that enables thermal insulation 250 to be coupled to ribs 240. More specifically, in the exemplary embodiment, first flange 300 is coupled to a first rib 240a and second flange 310 is coupled to a second rib 240b. For example, in one embodiment, first flange 300 and second flange 310 are coupled to ribs 240 using a plurality of rivets. Alternatively, first flange 300 and/or second flange 310 are coupled to ribs 240 using any coupling mechanism that enables thermal insulation support 250 to function as described herein.

In the exemplary embodiment, flange height 312 is greater than wave height 292. For example, in the exemplary embodiment, flange height 312 is at least approximately 0.25 in. More particularly, in the exemplary embodiment, flange height 312 is between approximately 0.5 in. and approximately 1.0 in. Even more particularly, in the exemplary embodiment, flange height 312 is approximately 0.75 in. Alternatively, first flange 300 and/or second flange 310 may have any height that enables thermal insulation support 250 to function as described herein. For example, bays 244 decrease in size along the X-axis 202 in at least some embodiments, and each thermal insulation support 250 is sized and/or configured to fit within a respective bay 244. Accordingly, in such embodiments, flange height 312 of first flange 300 may be different from flange height 312 of second flange 310.

In the exemplary embodiment, thermal insulation support 250 is fabricated from a heat-resistant material configured to withstand relatively high heat without substantially creeping. For example, in the exemplary embodiment, thermal insulation support 250 is fabricated from a titanium and/or a nickel-based material. Alternatively, thermal insulation support 250 may be fabricated from any material that enables thermal insulation support 250 to function as described herein.

In the exemplary embodiment, an insulation block 320 (shown in FIG. 2) is disposed on top of thermal insulation support 250 between first flange 300 and second flange 310. More specifically, in the exemplary embodiment, insulation block 320 is disposed remote from a warmer lower skin 210 and/or adjacent to a cooler upper skin 220. In the exemplary embodiment, insulation block 320 is a fabricated from a compliant material. Alternatively, insulation block 320 may be fabricated from any material that enables insulation block 320 to function as described herein.

To install thermal insulation support 250 within heat shield assembly 200, first flange 300 and/or second flange 310 are flexed towards the deflected configuration to facilitate decreasing a width of thermal insulation support 250. In the exemplary embodiment, thermal insulation support 250 is positioned within bay 244 such that first flange 300 and/or second flange 310 are oriented to extend upwardly (i.e., away from lower skin 210 and/or towards upper skin 220). In the exemplary embodiment, first flange 300 is coupled to first rib 240a, and second flange 310 is coupled to second rib 240b. In the exemplary embodiment, insulation block 320 is positioned on top of thermal insulation support 250.

The embodiments described herein relate generally to insulation systems and, more particularly, to a thermal insulation support for use in supporting a thermal insulation block within a heat shield. The embodiments described herein enable a buffer to be provided between a thermal insulation block and a lower skin of a heat shield assembly. The buffer facilitates increasing an efficiency of the heat shield assembly without substantially increasing a weight of the insulation and/or a cost or time associated with the installation of the insulation.

Exemplary embodiments of methods and systems for supporting thermal insulation are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of installing an insulation support within a heat shield assembly comprising a plurality of ribs that define a heat shield bay between adjacent ribs, said method comprising:
   coupling a first flange of the insulation support to a first rib of the adjacent ribs of the heat shield assembly, wherein the first flange extends a first distance from a first edge portion of a body, the first edge portion extending generally along a longitudinal axis of the body; and
   coupling a second flange of the insulation support to a second rib of the adjacent ribs of the heat shield assembly such that the insulation support is located and coupled within the heat shield bay, wherein the second flange extends a second distance from a second edge portion of the body, the second edge portion extending generally along the longitudinal axis of the body.

2. A method in accordance with claim 1 further comprising forming the body to have a wave-shaped configuration extending between the first edge portion and the second edge portion.

3. A method in accordance with claim 1 further comprising forming at least one of the first edge portion and the second edge portion to include a curved heel.

4. A method in accordance with claim 1 further comprising forming at least one of the first flange and the second flange to extend substantially perpendicularly from the body and extend away from a lower skin.

5. A method in accordance with claim 1 further comprising integrally forming the body, the first flange, and the second flange such that the insulation support is substantially seamless.

6. A method in accordance with claim 1 further comprising forming the insulation support at least partially from a resilient material that enables at least one of the first flange and the second flange to deflect from a base position.

7. A method in accordance with claim 1 further comprising positioning an insulation block on top of the insulation support.

8. A thermal insulation support for use within a heat shield assembly comprising a plurality of ribs that define a heat shield bay between adjacent ribs in the heat shield assembly, said thermal insulation support comprising:
   a body comprising a first edge portion and a second edge portion extending generally along a longitudinal axis of said body, said body being sized for insertion within the heat shield bay between adjacent ribs;
   a first flange extending a first distance from said first edge portion of said body, said first flange coupleable to a first rib of the adjacent ribs; and
   a second flange extending a second distance from said second edge portion of said body, said second flange coupleable to a second rib of the adjacent ribs, wherein said first flange and said second flange extend substantially perpendicularly from said body such that said first flange and said second flange extend substantially parallel relative to each other,
   wherein said body has a wave-shaped configuration extending between said first edge portion and said second edge portion, the wave-shaped configuration including a plurality of waves extending between said first edge portion and said second edge portion, said plurality of waves spaced along the longitudinal axis in a staggered configuration.

9. A thermal insulation support in accordance with claim 8, wherein at least one of said first edge portion and said second edge portion comprises a curved heel.

10. A thermal insulation support in accordance with claim 8, wherein said first flange, and said second flange are integrally formed with said body.

11. A thermal insulation support in accordance with claim 8, wherein said thermal insulation support is fabricated at least partially from a resilient material that enables at least one of said first flange and said second flange to deflect from a base position.

12. A heat shield assembly comprising:
a lower skin;
an upper skin;
a plurality of ribs extending between said lower skin and said upper skin, wherein a heat shield bay is defined between adjacent ribs of said plurality of ribs; and
at least one thermal insulation support disposed between said lower skin and said upper skin, and sized for insertion within said heat shield bay, said thermal insulation support comprising a body that comprises a first edge portion and a second edge portion extending generally along a longitudinal axis of said body, a first flange extending a first distance from said first edge portion of said body, and a second flange extending a second distance from said second edge portion of said body, wherein said at least one thermal insulation support is oriented between said adjacent pair of ribs such that said first flange is, coupled to a first rib of said adjacent pair of ribs and such that said second flange is coupled to a second rib of said adjacent pair of ribs.

13. A heat shield assembly in accordance with claim 12, wherein said body has a wave-shaped configuration extending between said first edge portion and said second edge portion, the wave-shaped configuration including a plurality of waves extending between said first edge portion and said second edge portion, said plurality of waves spaced along the longitudinal axis in a staggered configuration.

14. A heat shield assembly in accordance with claim 12, wherein at least one of said first edge portion and said second edge portion comprises a curved heel.

15. A heat shield assembly in accordance with claim 12, wherein at least one of said first flange and said second flange extend substantially perpendicularly from said body and extend away from the lower skin.

16. A heat shield assembly in accordance with claim 12, wherein said first flange, and said second flange are integrally formed with said body.

17. A heat shield assembly in accordance with claim 12 further comprising an insulation block disposed between said thermal insulation support and said upper skin.

18. A heat shield assembly in accordance with claim 12, wherein the heat shield is coupled to an aircraft engine.

19. A thermal insulation support in accordance with claim 8,
wherein said first flange comprises a first end coupled to said first edge portion and a second end spaced from said first edge portion in a first direction by the first distance; and
wherein said first flange and said second flange extend substantially parallel relative to each other in the first direction.

* * * * *